United States Patent [19]

Dinsch et al.

[11] Patent Number: 5,895,824

[45] Date of Patent: *Apr. 20, 1999

[54] PREPARATION OF POLYETHER POLYOLS CONTAINING AROMATICS

[75] Inventors: Stefan Dinsch; Regina Pretzsch, both of Schipkau; Juergen Winkler, Schwarzheide; Bernd Guettes, Sallgast; Karl-Heinz Steinchen, Schwarzheide, all of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/659,850

[22] Filed: Jun. 7, 1996

[30] Foreign Application Priority Data

Jun. 9, 1995 [DE] Germany ............... 195 21 058

[51] Int. Cl.$^6$ ................... C07C 89/02
[52] U.S. Cl. ............... 564/399; 521/174; 528/79; 528/421; 564/443; 568/700; 568/704; 568/705; 568/715; 568/811; 252/182.24; 252/182.26; 252/182.27
[58] Field of Search ............... 528/79, 421; 521/174; 564/399, 443; 568/700, 704, 705, 715, 811; 252/182.24, 182.26, 182.27

[56] References Cited

U.S. PATENT DOCUMENTS

| | | | |
|---|---|---|---|
| 4,209,609 | 6/1980 | Haas | 528/421 |
| 4,391,728 | 7/1983 | Korczak et al. | 252/182 |
| 4,562,290 | 12/1985 | Korczak et al. | 528/421 |
| 4,767,795 | 8/1988 | Adam et al. | |
| 5,030,758 | 7/1991 | Dietrich et al. | |

FOREIGN PATENT DOCUMENTS

| | | |
|---|---|---|
| 2099270 | 4/1993 | Canada. |
| 2097141 | 12/1993 | Canada. |
| 2562652 | 2/1988 | European Pat. Off.. |
| 0260467A2 | 3/1988 | European Pat. Off.. |
| 0315959A2 | 5/1989 | European Pat. Off.. |
| 318784A2 | 6/1989 | European Pat. Off.. |
| 0374534B1 | 6/1990 | European Pat. Off.. |
| 0377112A1 | 7/1990 | European Pat. Off.. |
| 0556393A1 | 8/1993 | European Pat. Off.. |
| 0572852A1 | 12/1993 | European Pat. Off.. |
| 2017038 | 10/1970 | Germany. |
| 4436852A1 | 4/1986 | Germany. |
| 4135871A1 | 4/1993 | Germany. |
| 4232970A1 | 4/1994 | Germany. |
| 4232970 | 5/1994 | Germany. |
| 4340045A1 | 6/1995 | Germany. |
| 4428152A1 | 1/1996 | Germany. |
| WO91/13878 | 9/1991 | WIPO. |
| WO92/07847 | 5/1992 | WIPO. |
| WO95/35289 | 12/1995 | WIPO. |
| WO96/11922 | 4/1996 | WIPO. |
| WO96/19476 | 6/1996 | WIPO. |

OTHER PUBLICATIONS

EPO Search Report dated Jun. 4, 1997; English Translation of Same EPO Report.

J.R. Epperson et al., Bioorganic & Medicinal Chemistry Letters, vol. 3, No. 12, pp. 2801-2804, 1993.

*Primary Examiner*—John M. Cooney, Jr.
*Attorney, Agent, or Firm*—Fernando A. Borrego; James J. Drake

[57] ABSTRACT

In a process for preparing polyether polyols containing aromatics by molecular addition of alkylene oxides to H-functional initiators at from 70° C. to 135° C. and pressures of from 0.1 MPa to 1.0 MPa, the alkoxylation is carried out using at least one initiator comprising at least 95% by weight of 2,3 and 3,4 isomers of tolylenediamine, from 0.5 to 4% by weight of 2,4 and 2,6 isomers of tolylenediamine and from 0.1 to 1.5% by weight of more volatile fractions from tolylenediamine production. The polyether polyols prepared by this process can be used as component of a polyol mixture for producing rigid polyurethane foams.

6 Claims, No Drawings

PREPARATION OF POLYETHER POLYOLS CONTAINING AROMATICS

The invention relates to a process for preparing polyether polyols containing aromatics by molecular addition of alkylene oxides to H-functional initiators, wherein the initiator used is a specific mixture of isomers of tolylenediamine (TDA), and also polyether polyols prepared by this process and their use as component of a polyol mixture for producing rigid polyurethane foams.

The preparation of polyetherols by alkoxylation of H-functional substances has long been known. The use of aromatic diamines such as isomer mixtures of TDA, specifically 2,4- and 2,6-TDA, 2,3- and 3,4-TDA (O-TDA) and mixtures with higher molecular weight aromatic diamines, has likewise already been described.

GB-A-972 772 describes the alkoxylation of 2,4- and 2,6-TDA and mixtures thereof.

The use of o-TDA as initiator for the preparation of polyetherols is disclosed in DE-C-2017038.

Furthermore, it is known that the propoxylation of TDA isomers leads to high-viscosity products whose handling is very problematical. In contrast thereto, ethoxylation of TDA isomers does lead to low-viscosity polyetherols, but their containing exclusively primary OH groups leads to high reaction rates with isocyanate. This makes them too active for most rigid foam applications.

Polyetherols well suited to the rigid foam application are described in U.S. Pat. No. 4,209,609. According to that patent, about 4 mol of ethylene oxide are added on per mol of TDA and further propylene oxide is then added on. The building in of an ethylene oxide inner block reduces the viscosity. The catalyst is preferably added only after the ethoxylation. This method leads, when using KOH as catalyst, to low-viscosity but not reproducibly preparable products having very high contents of free o-TDA (from 1 to 2% by weight).

In DD-A-290 201, use is made of an amine initiator which is obtained as distillation product in TDA purification. It comprises from 20 to 50% by weight of TDA isomers, predominantly 2,4 and 2,6 isomers, and from 50 to 80% by weight of a heavy product consisting essentially of higher molecular weight compounds such as aromatic and cycloaromatic hydrazine and TDA derivatives. These initiator mixtures lead to very dark polyetherols.

DD-A-290 202 describes the preparation of polyetherols based on initiators which are amine-containing distillation top products. They comprise from 10 to 40% by weight of 2,3-TDA, from 20 to 50% by weight of 3,4-TDA, from 30 to 60% by weight of 2,4- and 2,6-TDA and about 1% by weight of toluidines. The alkoxylation of this isomer mixture, sometimes also in combination with coinitiators and/or distillation bottom products, is carried out with the aid of basic catalysts, with nickel catalysts sometimes being present. This leads to increased contents of secondary amino groups.

EP-A-0 318 784 describes the preparation of a polyetherol based on o-TDA. The synthesis of the polyetherol is here carried out with the aid of specific amine catalysts. The products thus prepared are said to be free of all previously mentioned drawbacks such as crack formation and core discolorations in the foam. The preparative process leads to polyetherols based on o-TDA and having an OH number of 400–630, in which from 5 to 20% by weight of the groups reactive towards isocyanates are secondary amino groups and whose contents of free o-TDA are said to be below 0.2% by weight. The method of preparation described results in a considerable part of the amino groups being only monoalkoxylated, so that a relatively large proportion of secondary amino groups is left over. This is evidently the cause of the low viscosity. The polyetherols thus prepared have an increased initial activity during foaming, leading to reduction in the amounts of catalyst used. However, such a reduction in amount of catalyst during foaming adversely affects the curing of many systems in some applications. Thus, the rapid reaction of the secondary amino groups with isocyanate groups gradually increases the molecular weights and viscosities and greatly impairs the flow properties of systems, particularly in moldings, so that complete filling cannot be achieved, particularly in the case of large moldings as in refrigeration appliances.

DE-A-4232970 describes a process for preparing polyetherols using base-catalyzed molecular addition of alkylene oxides to TDA. The TDA has an isomer content of 2,3- and 3,4-TDA of $\geq 50\%$ by weight, based on the total amount of TDA, with the proportion of ethylene oxide being from 5 to 12% by weight of the total amount of alkylene oxide. It is further claimed that with increasing content of 2,3 and 3,4 isomers of TDA, the content of ethylene oxide in the alkylene oxide also increases. Moreover, the TDA isomer mixture also contains aromatic monoamines in an amount of $\leq 5\%$ by weight, based on the TDA, such as aniline and/or toluidines. The alkoxylation of this isomer mixture with the aid of base catalysis gives low-viscosity polyetherols having hydroxyl numbers of, for example, from 410 to 435 mg KOH/g. Specifically, in Example 1 a product having a hydroxyl number of 435 mg KOH/g has a viscosity at 25° C. of only 5100 mPas. This product contains 0.002% by weight of primary and secondary amino groups.

The low viscosity of 5100 mpas (20° C.) at a hydroxyl number of 435 mg KOH/g can however only be achieved using base catalysis of the reaction with aqueous potassium hydroxide solution either if the TDA as initiator contains a significantly higher amount of aniline or toluidines, or if the content of primary and secondary amino groups is likewise significantly higher. The desired low viscosity is thus achieved by means of a lowered functionality of the initiator mixture or in the polyol, as already described in EP 0318 784. The lowering of the viscosity is also possible by means of an increased content of ethylene oxide. However, in the example the content of ethylene oxide is only 2.8% by weight, based on the amount of alkylene oxide. This amount is, however, not sufficient to lower the viscosity to 5100 mpas at a hydroxyl number of 435 mg KOH/g. Increasing the content of primary and secondary amino groups also increases the danger of residual contents of free TDA.

U.S. Pat. No. 4,562,290 describes the preparation of polyetherols based on vicinal TDA. The isomer composition is about 90% by weight of 2,3- and 3,4-TDA and about 10% by weight of 2,4- and 2,6-TDA. The alkoxylation is carried out using an addition of from 1 to 3 mol of ethylene oxide at 125° C. and a propoxylation of from 4 to 8 mol of propylene oxide at more than 140° C. However, it has been found that the alkoxylation of vicinal TDA at elevated temperatures, such as synthesis temperatures of more than 140° C., leads to dark or thermally damaged polyetherols.

However, owing to changed requirement profiles, ever more lightly colored polyetherols are desired. The synthesis forced by means of the high temperature allows the propoxylation to occur predominantly at the OH groups formed by the prior ethoxylation and causes an increased proportion of NH groups to remain. This lowering of the functionality gives the reduced viscosity. However, for many applications the functionality of at least 4 is absolutely necessary. An increased proportion of NH groups has an adverse effect on the flow behavior during foam insulation of a refrigerator. Reaction of the NH groups with isocyanate groups impairs the flow and prevents complete filling of the space.

U.S. Pat. No. 4,391,728 describes only the propoxylation of vicinal TDA. Use is made of the same isomer mixture of TDA as in U.S. Pat. No. 4,562,290 and polyoxyalkylene polyethers having equivalent weights of from 50 to 300 and functionalities of from 2 to 6. Here too, the reaction temperature in the propoxylation is above 140° C. and thus leads to the disadvantages already indicated in U.S. Pat. No. 4,562,290.

It is an object of the present invention to develop an economically favorable process for preparing polyether polyols based on an isomer mixture of TDA, if desired in admixture with further coinitiators, with the polyether polyols thus prepared having an advantageous property profile for use in rigid polyurethane foam systems.

We have found that this object is achieved by the process for preparing polyether polyols containing aromatics by molecular addition of alkylene oxides to H-functional initiators being carried out in a customary manner with the initiator for the alkoxylation comprising at least 95% by weight of 2,3 and 3,4 isomers of TDA, from 0.5 to 4% by weight of 2,4 and 2,6 isomers of TDA and from 0.1 to 1.5% by weight of more volatile fractions from TDA production, with the proportions adding up to 100% by weight.

The invention accordingly provides a process for preparing polyether polyols containing aromatics by molecular addition of alkylene oxides to H-functional initiators at from 70° C. to 135° C. and pressures of from 0.1 MPa to 1.0 MPa, wherein the alkoxylation is carried out using an initiator comprising at least 95% by weight of 2,3 and 3,4 isomers of TDA, from 0.5 to 4% by weight of 2,4 and 2,6 isomers of TDA and from 0.1 to 1.5% by weight of more volatile fractions from TDA production.

The invention also provides the polyether polyols containing aromatics prepared by this process and provides for their use as component of a polyol mixture for producing rigid polyurethane foams.

The initiator mixture for the polyetherols of the invention contains at least 95% by weight of 2,3 and 3,4 isomers of TDA, from 0.5 to 4% by weight of 2,4 and 2,6 isomers of TDA and from 0.1 to 1.5% by weight of more volatile fractions from TDA production, with the proportions adding up to 100% by weight.

The more volatile fractions from TDA production preferably contain toluidines and aniline.

The TDA having the composition according to the invention is obtained, inter alia, as byproduct in the preparation of TDA containing 80% of 2,4-TDA and 20% of 2,6-DA, the starting material for the preparation of tolylene diisocyanate 80/20, one of the most widely used industrial isocyanates, and, with its low content of 2,4- and 2,6-TDA in the total TDA, is suitable for producing those structural differences in the polyetherol which result from preferential use of the 2,3 and 3,4 isomers and give excellent viscosity and flow properties.

Furthermore, the initiator mixture can contain additions of customary H-functional, generally alcoholic and/or amine coinitiators, for example diols such as glycols, eg. ethylene glycol and/or propylene glycol and their homologs, triols such as glycerol, and/or lower aliphatic amines.

The polyether polyols are prepared by the process of base-catalyzed alkylene oxide addition which is known per se.

The alkylene oxide addition is carried out using lower alkylene oxides such as ethylene oxide, propylene oxide and butylene oxide. Preference is given to using ethylene oxide and propylene oxide particularly in cases where a low viscosity of the polyether polyols prepared is desired.

The process of the invention for preparing polyether polyols containing aromatics is advantageously carried out in such a way that the first phase of the alkoxylation is an ethoxylation which is not catalyzed, with the molar ratio of TDA to ethylene oxide being from 1:2.5 to 1:4, preferably from 1:2.6 to 1:3, giving significantly lower contents of primary hydroxyl groups, and the subsequent second phase is a slightly catalyzed propoxylation at a KOH content of from 0.03 to 0.15% by weight.

Basic catalysts used are alkali metal and/or alkaline earth metal hydroxides and/or carbonates, in particular potassium hydroxide, in an amount of from 0.03 to 0.3% by weight, based on the total reaction mixture.

The hydroxyl numbers of the polyetherols prepared according to the invention are 340–420 mg KOH/g when this method is used. The products thus synthesized have viscosities at 25° C. of from 5000 to 20,000 mPas at the hydroxyl numbers specified and a functionality of from 3.95 to 4.

The contents of primary hydroxyl groups which are essential for the foaming reaction are $\leq 10\%$, generally around 5%, and the contents of secondary amino groups are <0.05%. Primary amino groups are not detectable.

Particularly suitable polyol components for foaming systems in the refrigerator application are polyetherols derived from a TDA isomer mixture of the composition according to the invention and having mean molecular masses of from 500 to 700 g/mol, but in particular from 540 to 570 g/mol.

A particular advantage of the polyetherols of the invention based on the TDA isomer mixture is the very low content of secondary amino groups, giving the functionality of from 3.95 to 4 for TDA-initiated polyetherols desired for the rigid foam application.

The TDA isomer mixture of the composition according to the invention leads, on alkoxylation, to polyetherols whose reactivity towards reactants containing isocyanate groups is at a low level. It is observed that this reactivity decreases with increasing content of 2,3 and 3,4 isomers of the initiator. Thus, a very high content of 2,3 and 3,4 isomers of TDA in the initiator, as applies to the composition according to the invention, enables the reactivity of the polyetherol to be kept at a low level. This gives, advantageously, a high degree of control of the foam system by means of catalysts and at the same time gives viscosities which are still sufficiently low to allow processing without problems.

The ethoxylation of the TDA is carried out at from about 100 to 130° C., the propoxylation with slight catalysis at from about 110 to 135° C., with pressures being able to be from 0.1 to 1.0 MPa.

The alkoxylation is followed by the customary post-reaction until conversion is complete. In the case of block polymers, the known separation by means of nitrogen follows. The raw polyether polyol thus formed is freed of unreacted alkylene oxide and volatile compounds and dewatered by distillation, preferably under reduced pressure, and the catalyst is removed by acid neutralization and subsequent filtration. The neutralization is preferably carried out using monobasic and/or polybasic organic and/or inorganic acids, for example phosphoric acid, hydrochloric acid or sulfuric acid, $CO_2$, but also acid salts, ion exchangers or earths.

The contents of free TDA are at most 180 ppm.

The polyetherols thus obtained can be used, in particular, as starting materials for producing polyurethane plastics, preferably rigid polyurethane foams. For this purpose, they are reacted and foamed with isocyanates and/or compounds containing isocyanate groups and, if desired, further polyols in the presence of auxiliaries and/or additives, such as catalysts and blowing agents.

Isocyanate components used are the customary isocyanates such as tolylene diisocyanate, diphenylmethane diisocyanate, polyphenylpolymethylene polyisocyanate, but also prepolymers containing isocyanate groups or isocyanates containing isocyanurate or uretdione groups.

Rigid polyurethane foam is preferably produced using polyphenylpolymethylene polyisocyanate.

Blowing agents used are usually volatile, largely inert, particularly organic compounds, for example hydrocarbons such as n-pentane, n-hexane, cyclopentane, cyclohexane and/or completely or partially halogenated, particularly chlorinated and/or fluorinated, hydrocarbons, for example fluorotrichloromethane or difluorodichloromethane.

Catalysts used are preferably the customary amine catalysts, eg. dimethylcyclohexylamine.

Foams thus produced have, particularly when pentane or cyclopentane are used as blowing agent, low thermal conductivities, excellent flow behavior, a regular foam structure, optimal curing and high service life and properties. Processing leads to crack-free foams. They thus have an advantageous property profile, particularly for use in refrigerators and sandwich elements.

The preparation of the polyetherols based on the TDA isomer mixture according to the invention is illustrated by the following examples.

EXAMPLE 1

In a 1 1 autoclave fitted with stirrer, metering facilities, heating and cooling and pressure measurement, 122 g of TDA containing 96.4% by weight of 2,3- and 3,4-TDA, 3.45% by weight of 2,4- and 2,6-TDA and 0.15% by weight of volatile constituents were treated with nitrogen and reacted with 110 g of ethylene oxide (about 2.5 mol) at 95–110° C., at a pressure dropping from 5.0 to 1.0 bar, and subjected to a post-reaction at 110° C. for 1.5 hours. Subsequently, after purging with nitrogen, the reaction mixture was admixed with 1 g of aqueous potassium hydroxide solution (48% strength) and homogenized. 328 g of propylene oxide were then metered in at 100–120° C., at a pressure dropping from 6.0 to 1.0 bar. The post-reaction time was 2.5 hours at 115° C. The alkaline polyetherol was hydrolyzed with water and neutralized with phosphoric acid. It was subsequently vacuum distilled and filtered.

The polyetherol obtained had the following properties:

Hydroxyl number: 386 mg KOH/g

Viscosity at 25° C.: 5750 mPa s

Content of primary OH: 5% by weight

Content of sec. amino groups: 0.02% by weight

Comparative Example 1

122 g of TDA containing 88.2% by weight of 2,3- and 3,4-TDA, 11.51% by weight of 2,4- and 2,6-TDA and 0.29% by weight of volatile constituents were placed in an autoclave of the type described in Example 1. 110 g of ethylene oxide were reacted at 125° C., at a pressure dropping from 5.0 to 1.0 bar and the mixture was subjected to a post-reaction at 110° C. for 1.5 hours. Subsequently, after purging with nitrogen, the reaction mixture was admixed with 1 g of aqueous potassium hydroxide solution (48% strength) and homogenized. 328 g of propylene oxide were subsequently metered in at 145–150° C., at a pressure dropping from 6.0 to 1.0 bar. The post-reaction time was 2.5 hours at 115° C. The alkali polyetherol was hydrolyzed with water and neutralized with phosphoric acid. It was then vacuum distilled and filtered.

The polyetherol obtained had the following properties:

Hydroxyl number: 382 mg KOH/g

Viscosity at 25° C.: 4920 mPa s

Content of primary OH: 7% by weight

Content of sec. amino groups: 0.19% by weight

In contrast to Example 1, the product was brown.

EXAMPLE 2

In an autoclave similar to that of Example 1, 150 g of TDA containing 97.6% by weight of 2,3- and 3,4-TDA, 2.29% by weight of 2,4- and 2,6-TDA and 0.11% by weight of volatile constituents were treated with nitrogen and reacted with 150 g of ethylene oxide (about 3 mol) at 100–115° C., at a pressure dropping from 6.0 to 2.0 bar and subjected to a post-reaction at 110° C. for 1.5 hours. Subsequently, after purging with nitrogen, the reaction mixture was admixed with 0.8 g of potassium hydroxide solution and homogenized. 390 g of propylene oxide were then metered in at from 105 to 120° C., at a pressure dropping from 5.0 to 1.0 bar. The post-reaction time was 3.5 hours at 115° C.

After purification of the polyetherol, the following values were obtained:

Hydroxyl number: 417 mg KOH/g

Viscosity at 25° C.: 16440 mpa s

Content of primary OH: 6.5% by weight

Content of sec. amino groups: 0.011% by weight

Comparative Example 2

150 g of TDA containing 67.9% by weight of 2,3- and 3,4-TDA, 31.26% by weight of 2,4- and 2,6-TDA and 0.84% by weight of volatile constituents were placed in an autoclave similar to that of Example 1, admixed with 2 g of potassium hydroxide solution and homogenized. At about 120° C., 150 g of ethylene oxide were metered in, followed by 390 g of propylene oxide. The post-reaction time was 3.5 hours at 115° C.

After purification of the polyetherol, the following values were obtained:

Hydroxyl number: 403 mg KOH/g

Viscosity at 25° C.: 13120 mPa S

Content of primary OH: 12.4% by weight

Content of sec. amino groups: 0.24% by weight

Examples 3a and 3b

In an autoclave similar to that of Example 1, 122 g of TDA containing 97.1% by weight (Example 3a) or 95.7% by weight (Example 3b) of 2,3- and 3,4-TDA were treated with nitrogen and reacted with 176 g of ethylene oxide (about 4 mol) at 95–115° C., at a pressure dropping from 6.0 to 1.0 bar and post-reaction at 110° C. was carried out for 1.5 hours. Subsequently, after purging with nitrogen, the reaction mixture was admixed with 1 g of potassium hydroxide solution and homogenized. 262 g of propylene oxide were then metered in at 100 to 120° C., at a pressure dropping from 6.0 to 1.0 bar. The post-reaction time was 2.5 hours at 110° C.

After purification of the polyetherol, the values shown in Table 1 were obtained.

Comparative Examples 3a and 3b

Syntheses similar to those of Examples 3a and 3b were carried out using TDA containing 88.2% by weight (Comparative Example 3a) or 67.9% by weight (Comparative Example 3b) of 2,3- and 3,4-TDA.

After purification of the polyetherol, the values shown in Table 1 were obtained.

TABLE 1

|  |  | Ex. 3a | Ex. 3b | Comp. Ex. 3a | Comp. Ex. 3b |
| --- | --- | --- | --- | --- | --- |
| 2,3-/3,4-TDA content | % by wt. | 97.1 | 95.7 | 88.2 | 67.9 |
| 2,4-/2,6-TDA content | % by wt. | 2.75 | 4.13 | 11.51 | 31.26 |
| Volatile toluidines/aniline | % by wt. | 0.15 | 0.17 | 0.29 | 0.84 |
| Hydroxyl number | mg KOH/g | 344 | 350 | 346 | 351 |
| Viscosity at 25° C. | mPa s | 4400 | 4410 | 4410 | 4460 |
| Content of primary OH | % | 8.1 | 8.2 | 8.4 | 8.2 |
| Content of sec. amino groups | % | 0.010 | 0.009 | 0.007 | 0.011 |
| Use of amine catalyst in foam | parts | 102 | 100 | 96 | 91 |

To obtain comparably reactive systems, increased amounts of amine catalysts have to be used with increasing 2,3/3,4 isomer content.

We claim:

1. A process for preparing polyether polyols containing aromatics by molecular addition of alkylene oxides to H-functional initiators at from 70° C. to 135° C. and pressures of from 0.1 MPa to 1.0 MPa, wherein the alkoxylation is carried out using at least one initiator comprising at least 95% by weight of 2,3 and 3,4 isomers of tolylenediamine, from 0.5 to 4% by weight of 2,4 and 2,6 isomers of tolylenediamine and from 0.1 to 1.5% by weight of more volatile fractions from tolylenediamine production, with the proportions adding up to 100% by weight, and the first phase of the alkoxylation is an ethoxylation which is not catalyzed and is carried out using a molar ratio of tolylenediamine to ethylene oxide of from 1:2.5 to 1:4.

2. A process for preparing polyether polyols containing aromatics as claimed in claim 1, wherein the second phase of the alkoxylation is carried out in the presence of from 0.03 to 0.15% by weight of potassium hydroxide, with molecular masses of from 500 to 700 g/mol being synthesized.

3. A polyether polyol containing aromatics which can be prepared by molar addition of alkylene oxides to H-functional initiators at from 70° C. to 135° C. and pressures of from 0.1 MPa to 1.0 MPa, wherein the alkoxylation is carried out using at least one initiator comprising at least 95% by weight of 2,3 and 3,4 isomers of tolylenediamine, from 0.5 to 4% by weight of 2,4 and 2,6 isomers of tolylenediamine and from 0.1 to 1.5% by weight of more volatile fractions from tolylenediamine production, with the proportions adding up to 100% by weight, and the first phase of the alkoxylation is an ethoxylation which is not catalyzed and is carried out using a molar ratio of tolylenediamine to ethylene oxide of from 1:2.5 to 1:4.

4. A polyether polyol containing aromatics as claimed in claim 3, wherein the basic, aromatic polyether polyol contains less than 0.05% by weight of non-tertiary bound nitrogen.

5. A polyether polyol containing aromatics as claimed in claim 3, wherein the basic, aromatic polyether polyol contains from 2 to 10% by weight of primary hydroxyl groups.

6. A method of using the polyether polyol containing aromatics as claimed in claim 4 as a component of a polyol mixture for producing rigid polyurethane foams.

* * * * *